Jan. 25, 1955  W. N. MESSIMER  2,700,208
METHOD OF REPAIRING RAILWAY AXLE JOURNAL
AND JOURNAL BEARING ASSEMBLIES
Filed May 8, 1953  4 Sheets-Sheet 1

INVENTOR.
Ward N. Messimer
BY
Atty.

INVENTOR:
Ward N. Messimer,
BY
C. C. Hines,
Atty.

Jan. 25, 1955  W. N. MESSIMER  2,700,208
METHOD OF REPAIRING RAILWAY AXLE JOURNAL
AND JOURNAL BEARING ASSEMBLIES
Filed May 8, 1953  4 Sheets-Sheet 3

INVENTOR:
Ward N. Messimer
BY
Atty.

INVENTOR:
Ward N. Messimer
BY
Atty.

United States Patent Office 2,700,208
Patented Jan. 25, 1955

2,700,208

METHOD OF REPAIRING RAILWAY AXLE JOURNAL AND JOURNAL BEARING ASSEMBLIES

Ward N. Messimer, Chicago, Ill.

Application May 8, 1953, Serial No. 353,857

2 Claims. (Cl. 29—149.5)

This invention relates to a novel method of and provision of means for improving the conditions affecting the lubrication of friction journals and journal bearings of the types and kinds commonly used on railway cars and similar conveyances and thereby avoid lubrication failures, commonly called hot boxes, hot journals, cut journals and the like, by providing and maintaining a predetermined or designated fit or range of fits as between axle journals and axle journal bearings (sometimes called journal brasses) of the friction types such as commonly used on railway freight and passenger train cars, and other like axle journals and bearings, in which the bearings are arranged above and rest on the journals, thus providing a friction contact between journals and bearings when the journals revolve. The journals and bearings in common use on railway freight and passenger train cars are parts of the journal box assemblies consisting of the journal boxes themselves which enclose and protect the other parts contained therein, the box lids which seal the front openings of the boxes, the dust guards and plugs which seal the back openings of the boxes, the journal box packing, the lubricating oil with which the packing is saturated and the journal bearing wedges which hold the bearings in place and through which the weight of car and lading imposed thereon is transmitted to the journal bearings and thence to the journals and eventually to the wheels and the running rails.

The axle journals and bearings are, of course, subject to wear and during the time range of their useful life are subject to prescribed condemning limits requiring their removal from service when said limits are equalled or exceeded. One of the limiting requirements applying to an axle journal is that when through wear or other reasons its diameter is reduced below a specified limiting dimension it is regarded as unserviceable and unfit for further use. From time to time during their useful life, axles are removed from and reapplied to cars for various reasons and the customary practice is to apply new journal bearings whenever such axles are applied or reapplied and regardless of whether they are new or re-used. New journal bearings are also customarily applied to replace bearings removed because of being defective or for other reasons.

From time to time journals of axles also require machining such as turning, grinding or refinishing by other means to eliminate surface defects. When such machining is performed it is not the custom nor is it required that the journals be machined to any specific predetermined diameter size or size range to fit or to facilitate the fitting of bearings. In other words, when applying journal bearings to axle journals which have had their diameters reduced by machining or by wear from long service new bearings having full bore diameter are used without regard to the size of the journal to which they are applied.

A new A. A. R. standard journal bearing manufactured within permissible tolerances has a bore diameter 3/64 inch to 1/8 inch greater than the new or largest diameter of axle journal of the same nominal size on which it is designed to be used, and because of this variation the bearing surface curvature of such journal bearing is not the same and therefore not concentric with the bearing surface curvature of a new journal and the extent of the deviation between them becomes more pronounced as the diameter of the journal is progressively reduced by machining and wear, but in any event they theoretically would not provide more than a line contact when they are brought together. Therefore, a new bearing applied to a new or full sized journal has a contact of negligible bearing value and when initially placed in service and for a considerable period thereafter it is difficult and often impossible to provide adequate lubrication and avoid overheating because of the small contact area and resulting high unit pressure the lubricating oil must withstand especially under the weight of a full or near capacity load. For the reasons above described the lubrication processes frequently fail in the initial stages and the proportion of such failures greatly increases as the deviation in the concentricity of the contact surfaces of the bearings and the journal becomes still more pronounced as and when from time to time the journal diameter is subjected to further reduction from wear or machining.

As a further explanation of the above phenomena it may be considered that when a new bearing with full size bore is initially applied to a new or full size journal the contact between them occurs only at the center or crown of the bearing and as such contact theoretically consists of a line the effectiveness of lubrication and the ability of the bearing toward withstanding the load imposed upon it is doubtful until it becomes "worn in" and the bearing area becomes sufficient in extent to produce a unit bearing pressure low enough so that a lubricating oil of reasonably good quality can be expected to produce good lubrication results.

An opening or gap between the journal and the bearing lining extending sidewise and flanking the contact surface from both sides of the bearing crown exists but is not very large and when a new bearing is used on a new journal and hence the duration of the "wearing in" process is fairly short until an effective bearing surface covering the full width of the bearing lining and a satisfactory unit bearing pressure is obtained. However, when a new bearing is applied to a journal worn near to condemning limit there can be a difference between its diameter and that of the bore diameter of the bearing applied to it of up to 5/8 inch and when the maximum difference obtains the opening is very large and the time required to "wear in" the bearing to obtain a fully effective bearing surface and to obtain a satisfactory unit bearing pressure are likewise very great. For axle journals of intermediate diameters these time factors are proportionate in extent.

The openings or gaps described above extend laterally from the edge of contact surface between journal and bearing to the outside edge of bearing lining and they constitute cavities into which dirt, lint, moisture, separate strands of waste and sometimes strands of waste attached to the main body of packing and other foreign substances are carried by a rotating journal. These undesirable substances accumulate in the cavity until by chance they are carried away by reverse movement of journal or are discovered and removed manually. Frequently some of such substances becomes permanently lodged within the bearing contact area where it becomes a compact mass and forms a wiper or abrasive which retards or prevents the flow of oil to the bearing surfaces and eventually results in a lubrication failure. It is only through constant vigilance, attention and care that the amount of failures from this cause does not reach epidemic proportions.

Even though these cavities are less extensive when new standard bearings are used on new or full size journals, they are sufficient to trap and hold undesired foreign substances and therefore are potential lubrication failures until the gap or cavity is eliminated by the bearings wearing in for the full width of bearing surface. However, when new standard bearings are used on reduced diameter journals close to condemning limit the cavities are ever present from the time initially applied until they are worn out. As an example a 40 ton axle with journal diameter slightly above condemning limit will continue to have a substantial gap or cavity on each side between journal and bearing when the lining metal of bearing is completely worn through at the crown. It follows, therefore, that this condition prevails over a a substantial portion of the life of a standard bearing when used on journals of the smaller reduced sizes.

The objectionable conitions aforementioned are extremely conducive to lubrication failures and largely because of them the railways are continuing to experience an excessive number of car delays, train detentions, derailments and even serious accidents, and present indications are that there is no appreciable improvement but rather some railways appear to be experiencing a greater amount of such trouble. Various and sundry causes and reasons have been advanced for these troublesome conditions which have existed for many years and many corrective measures have been recommended, tried, adopted or abandoned without much headway toward overcoming them and without any outstanding beneficial results.

As result of my long and extensive observations of and experiences with the practical use and performance of bearings on railway cars and verified by experiments made by me, I have discovered that unless a journal bearing had a lining with a contour or bore conforming exactly or closely with the bearing surface contour of the axle journal when it is initially applied, overheating is likely to occur at the outset and this likelihood increases correspondingly as the degree of difference in diameter of the contour of each increases until a potential lubrication failure prevails. Experiments with bearings where the bore diameter of their linings exceeded the journal diameters a considerable extent when initially placed in operation under full or under near capacity loads disclosed that many of the linings did not "wear" into but rather "burned" into conformance with the journal contour in which process the bearing metal flowed and became displaced under the high pressure, high temperature and imperfect lubrication conditions to which it was subjected. Many bearings so subjected may continue in service without complete failure but the damaged bearing metal linings caused by excessive pressure and temperature generally result in premature condemnation and replacement expense the first time the defective condition becomes known. In many other instances the initial temperature rise continues until the safe limits for the bearing metal lining and for proper lubrication are exceeded and thereafter lubrication failures immediately occur.

I have also discovered that it is very rare to find an accumulation of dirt, lint, strands of waste or other foreign substance within the bearing contact area of a bearing that had worn in for the full width of bearing surface and when found there were accompanying indications of rough handling during which the bearing evidently was unseated from the journal and permitted foreign substances to enter at that time. Generally bearings fully worn in give very little trouble.

The object of the present invention is to provide a modified design of friction journal bearing and a revised practice for machining the bearing surfaces of journal bearings and axle journals and also to provide a novel, simple, reliable, efficient and economical method for treating, grading, identifying, marking, selecting, handling and inspecting such journal bearings and axle journals in use or for use on railway freight and passenger train cars or on other conveyances to which they are applicable so as to obtain and maintain effective fits and adequate areas of contact between journal bearings and axle journals to which applied thereby substantially reducing lubrication failures and overcoming other undesirable conditions and results brought about or permitted to continue under the unsatisfactory and inefficient designs and methods heretofore commonly employed in practice for fitting and applying friction journal bearings to axle journals of said railway freight and passenger train cars.

The accompanying drawings illustrate the application of my invention to the conventional arrangement of friction journal bearing and axle journal of the type commonly in use on railway freight and passenger train cars:

Figure 1:
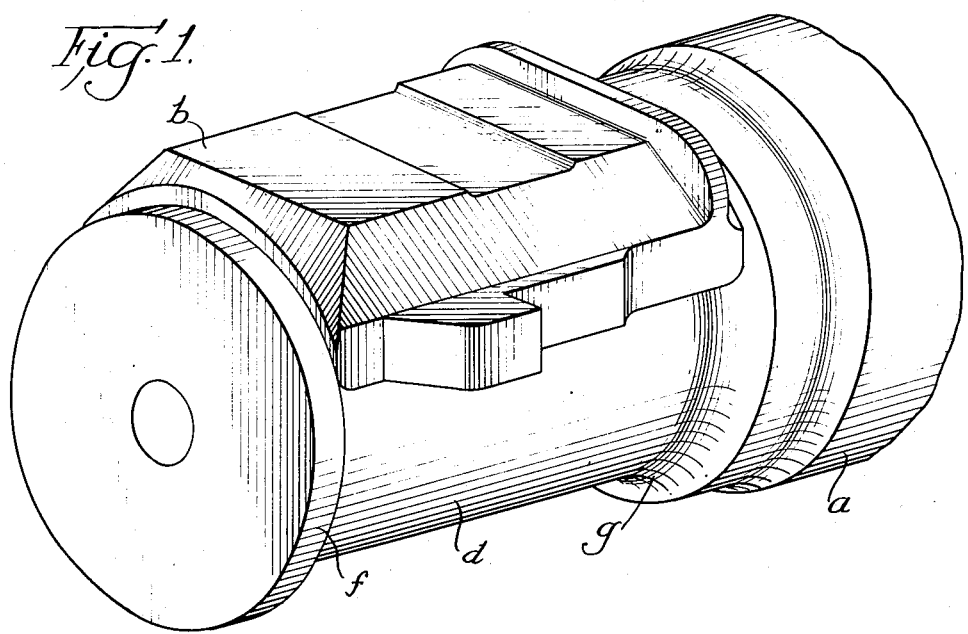
Fig. 1 is a perspective view of an axle journal and bearing of a type to which my invention relates.

Referring now to the drawings in more detail, Fig. 1 shows in perspective a view of the end portion of an A. A. R. standard axle $a$ to which an A. A. R. standard journal bearing $b$ located between journal collar $f$ and journal fillet $g$ and resting upon journal $d$ has been applied. This view illustrates the relative positions of these parts in service wherein there is a friction contact between the journal $d$ when revolving under and within the concaved or circular babbitt or other suitable bearing metal lined surface of journal bearing and through which the weight of the car and lading above it is transmitted and supported by the axle. Lubricating oil to reduce friction and prevent overheating is introduced and fed to the contacting friction surfaces between the journal and bearing from oil saturated waste packing contacting the journal in bottom cavity of journal box. The inadequacy of the present designs, practices and methods toward providing proper fits and adequate bearing contact surface between journal and bearing and the resulting inability to secure adequate lubrication for these parts at all times due to such improper fitting is one of the deficiencies which the designs, practices and methods embodied in my invention are devised to correct.

Figure 2:
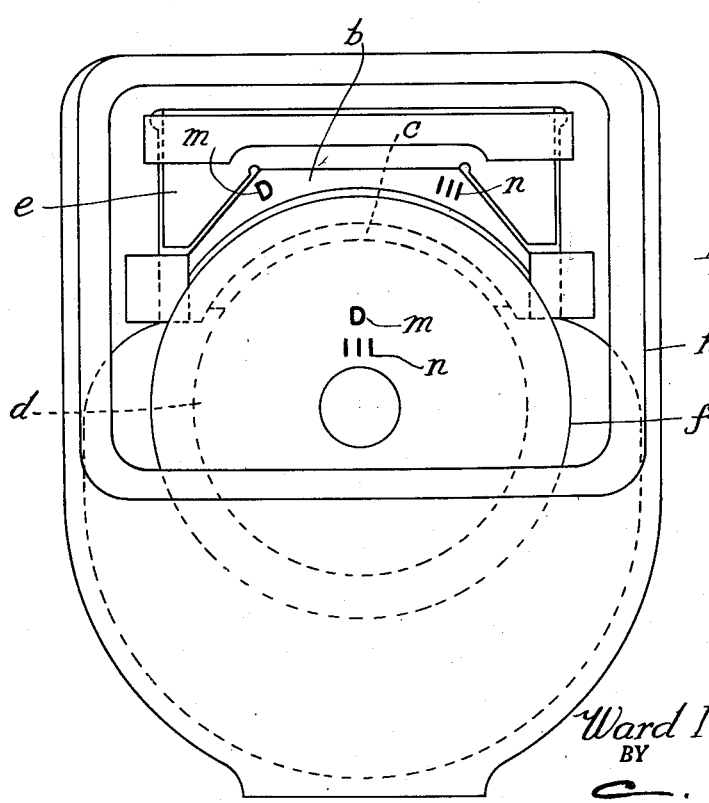
Fig. 2 is an end elevation of a journal box with lid removed showing axle journal and bearing mounted therein with typical class and group markings on journal to indicate its reduced diameter stage and with corresponding markings on bearing to indicate a bearing of proper size applied thereto.

Fig. 2 is an end elevation of the journal $d$ and journal bearing $b$ shown in Fig. 1 which illustrates bearing metal lining $c$ of journal bearing $b$ prefitted as embodied in my invention arranged in their relation to the journal bearing wedge $e$ and the journal box $h$ (with lid removed). This figure also illustrates the designation marking $m$ for capacity class and $n$ for diameter size group that are stamped, embossed, cast or otherwise applied in accordance with my invention on the outside end, edges or surfaces of axle journal and of journal bearing at a convenient location on such ends, edges or surfaces where a view of them is unobstructed by any other portion of the journal box assembly such as journal bearing wedge, axle journal collar or the journal box itself and are readily and conveniently observable when the journal box lid is opened or removed. In this illustration the capacity class designation $m$ is signified by the capital letter D and the diameter size group $n$ is signified by the Roman numeral III shown on the end of axle journal $d$ and on the end of journal bearing $b$ respectively. The designation markings being the same on both the axle journal $d$ and journal bearing $b$ signifies an axle journal of a specific outside diameter fitted with a preformed journal bearing having bore diameter of the same dimension.

Figure 3:
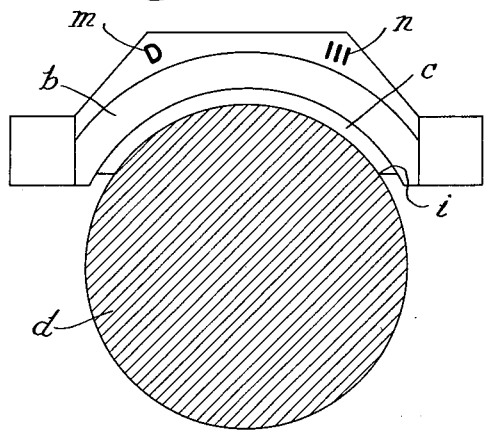
Fig. 3 is a sectional view through a journal of reduced diameter showing end elevation of a bearing embodying my invention conformably fitted thereto.

Fig. 3 is a cross section of journal $d$ and end elevation of bearing $b$ shown in Fig. 2 to more clearly illustrate the relationship of the bearing surfaces between them. As the outside and bore diameter of the journal and bearing respectively were presumed to be the same they are also presumed to have identical bearing surface contours and therefore would fit each other properly. As in Fig. 2 indication of such proper fit would be signified by each having the same designating marking. This illustration is to convey that should two bearing surfaces constructed with same diameters be brought together in conformity with my invention they will have an effective contact equivalent to the full width of the journal bearing lining and hence will also have the maximum of effective bearing area.

Fig. 3 also illustrates that in accordance with my invention the edges $i$ of the lining $c$ on each side of bearing $b$ touches and forms a barrier to prevent dirt, lint, waste or any foreign substance in the journal box or adhering to the rotating journal reaching the contacting bearing surfaces. There is a very slight opening at the edge of bearing lining between the bearing and the journal equivalent to the thickness of the oil film which separates them. This opening will permit a sufficient quantity of oil to continue to flow to the wearing surfaces if it is not obstructed. The amount of oil fed from the packing and adhering to the rotating journal is more than will pass the opening at edge of bearing and more than required for adequate lubrication and the excess is stopped at the edge $i$ of bearing lining or barrier and falls or flows back to the packing to begin another such cycle. The flow of this excess oil from the edge $i$ flushes away particles of dirt, lint, waste, etc., that may be carried there by the journal and which are too large to pass the restricted oil supply opening. This flushing process thus prevents undesirable substance from retarding or cutting off the flow of oil which would otherwise occur and also reduces the likelihood of lubrication failure.

This feature of my invention embodies a change in the design of journal bearing in which the bearing lining metal is increased in amount and in thickness on each side or flank so that when it is bored to proper contour and proper crown thickness during the preforming operation the lining will have a thickness at edge $i$ sufficient to provide a complete and full contact with any non-condemnable journal of corresponding class on which it may be used regardless of the diameter to which such journal may have been reduced by wear or machining.

Figure 4:
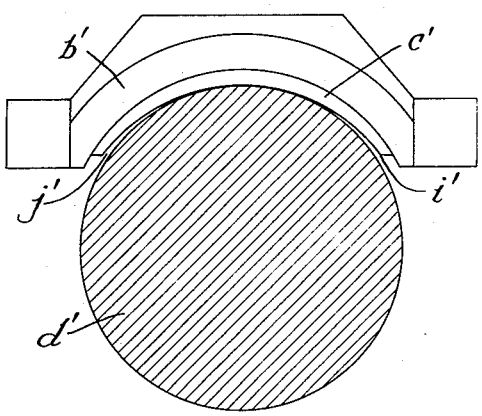
Fig. 4 is a view similar to Fig. 3 showing the variance in fit which occurs when according to the customary practice a bearing of full new size is used with a journal of reduced diameter.
Figure 5:
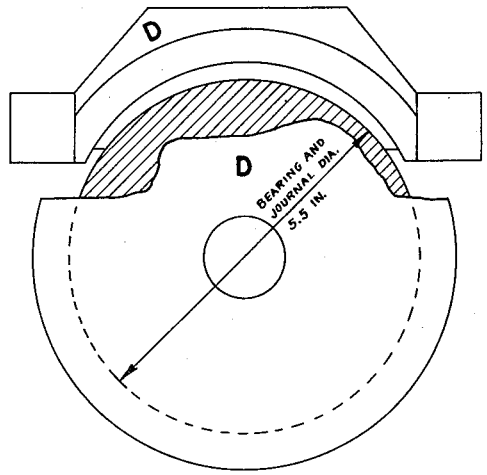
Figs. 5, 6, 7, 8 and 9 are diagrammatic views showing a new or full size journal of a typical capacity class and showing typical successive stages of diameter reduction thereof over its useful life and also showing bearings of a corresponding group preformed to fit the journal and at each of the several reduced diameter stages as embodied in my invention.
Figure 10:
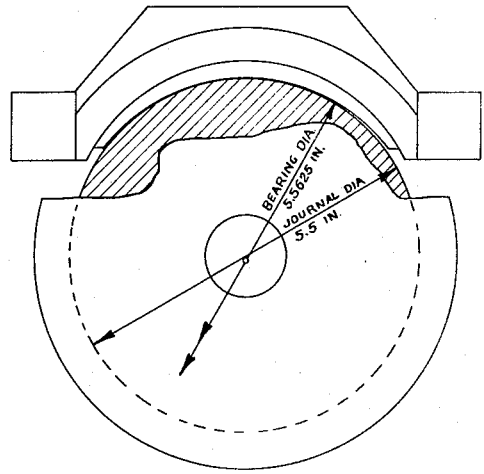
Figs. 10, 11, 12, 13 and 14 are views corresponding to Figs. 5, 6, 7, 8 and 9 respectively showing the contact variances that occur when according to the customary practice a new standard bearing of full size bore is used with a new journal of corresponding class and at each corresponding reduced diameter stage thereof.
Figure 8:
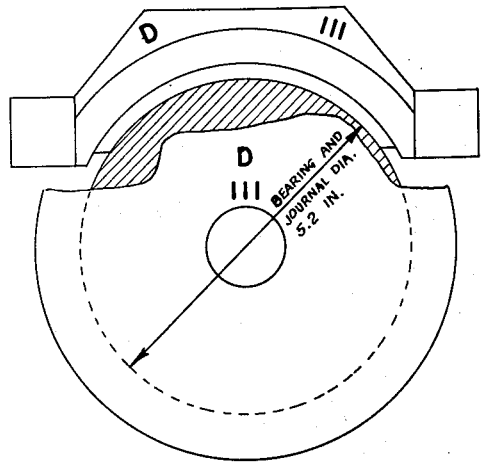
Figure 13:
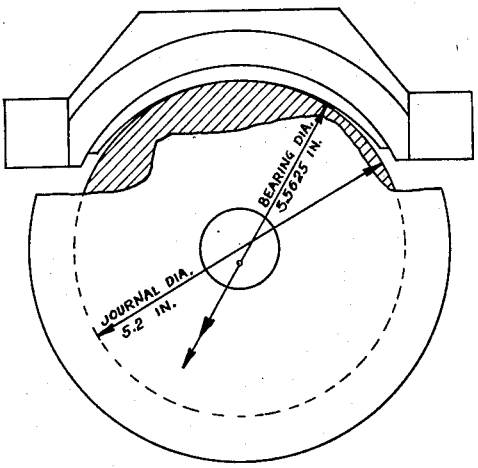
Figure 9:
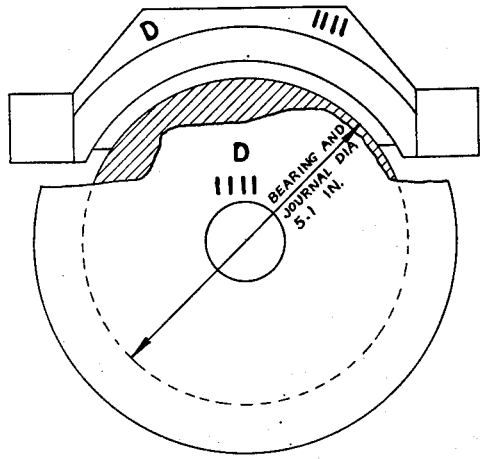
Figure 14:
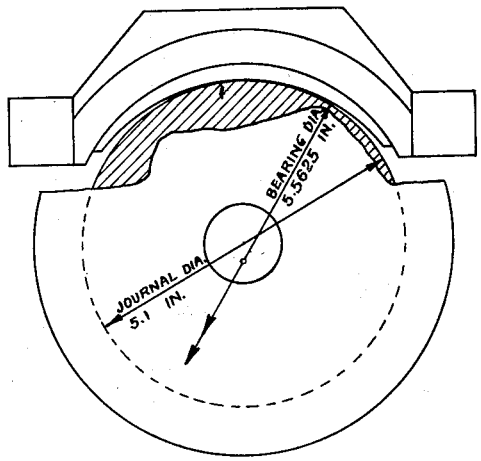
Figure 6:
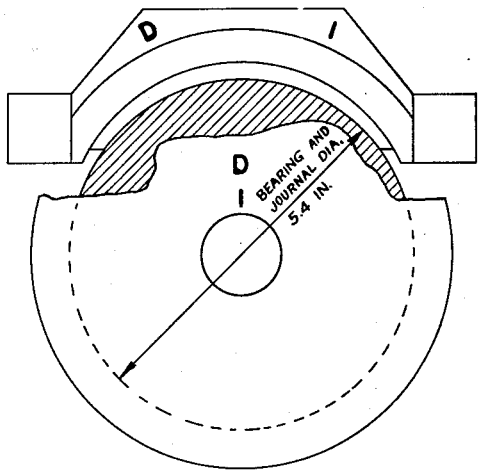
Figure 11:
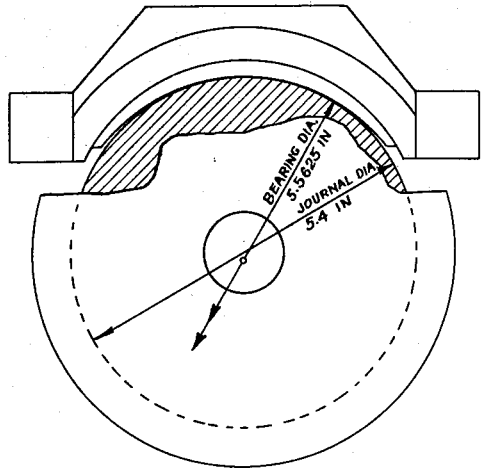
Figure 7:
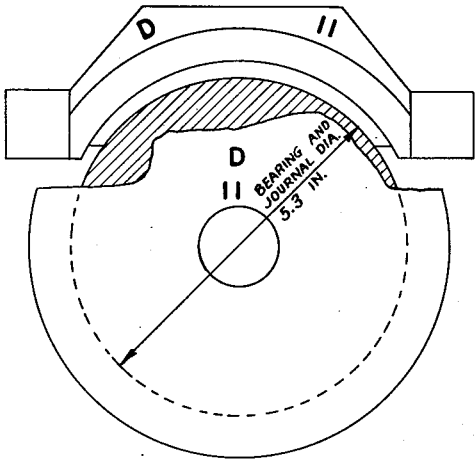
Figure 12:
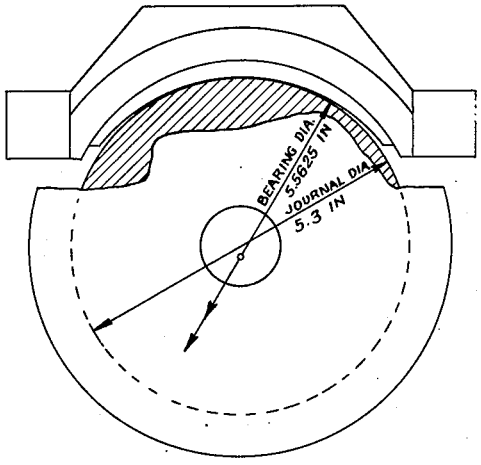

Fig. 4 is a cross section of an axle journal $d'$ of reduced outside diameter fitted with a journal bearing $b'$ which had its lining $c'$ bored full size in accordance with the present customary practice for the manufacture of new A. A. R. standard bearings. The disparity in relationship between them is readily observable and it may be seen that the curvatures of the two surfaces are not concentric but instead they contact only at the center or crown of the bearing. Therefore, the initial bearing area is very limited and of negligible bearing value thus offering a very unfavorable contrast when compared with the full effective bearing area obtained under the conditions embodied in my invention and illustrated in Fig. 3.

Fig. 4 also illustrates that the edges $i'$ of lining $c'$ on each side of new bearing $b'$ manufactured to existing A. A. R. standard design do not contact the journal surface and that the gap $j'$ formed between the diverging bearing surfaces of bearing and journal produces a cavity between them into which undesirable substances can accumulate and retard or cut off the flow of oil to the surfaces where they do contact. Figs. 10 to 14 inclusive show diagrammatically by comparison how the gap or cavity $j'$ increases in extent as the diameter of the journal diminishes as the final condemning limit is approached. Therefore, in addition to and in conjunction with the very limited initial bearing value and resulting unsatisfactory lubrication performance inherent in the A. A. R. standard design of journal bearing and customary practice of fitting the same to axle journals, it also may be said that such design of bearing is susceptible to further lubrication difficulty and possible failure due to its permitting the accumulation of undesirable substances under the bearing. This undesirable feature also offers a very unfavorable contrast when compared with the conditions embodied in my invention and illustrated in Fig. 3.

My invention does not necessarily establish any specific marks, symbols, dimensions, sizes or range of sizes, tolerances and the like to regulate and facilitate the proper fitting of bearings and journals of the friction types commonly used on railway cars but rather it provides designs, practices and methods applicable to any selected arrangement or arrangements of marks, symbols, letters, numbers, dimensions, sizes or range of sizes, tolerances and the like as may be established, applied or used in accordance with the designs, practices and methods embodied in my invention to regulate and facilitate the fitting of such bearings and journals. To clearly explain my invention and the novel features claimed for it I have arbitrarily selected one such arrangement which is considered very practical and convenient but which can be used not only to explain it but also to carry into actual practice the various features which the invention embodies.

The A. A. R. letter designation, nominal capacity and nominal sizes of axle journal and journal bearing for each of the six A. A. R. standard capacities are shown in following table:

Table No. 1

| A. A. R. Letter | Nominal Capacity, Pounds | Nominal Size of Axle Journal, Inches | Nominal Size of Journal Bearing, Inches |
|---|---|---|---|
| A | 40,000 | 3¾ x 7 | 3¾ x 7 |
| B | 60,000 | 4¼ x 8 | 4¼ x 8 |
| C | 80,000 | 5 x 9 | 5 x 9 |
| D | 100,000 | 5½ x 10 | 5½ x 10 |
| E | 140,000 | 6 x 11 | 6 x 11 |
| F | 200,000 | 6½ x 12 | 6½ x 12 |

As a means for explaining my invention and also for carrying it into practice, I employ a new method of maintaining effective bearing areas between bearings and journals at all stages and a new system of marking to indicate their class and diameter size groups. For convenience when signifying class designation $m$ I have chosen letters which correspond with the A. A. R. letters for the same capacity as indicated in the above table, their application being illustrated in Figs. 2 and 3. When such letters are used alone without diameter size group designation $n$ they indicate on a journal that its diameter conforms with the nominal or new diameter for the capacity class axle journal it represents and on a bearing that its lining is bored to the actual dimension for diameter as indicated by its nominal size. On a journal when such letters are supplemented by group designation $n$ it indicates a journal of a reduced diameter group and on a bearing that its lining has been bored to fit a journal of a reduced diameter group. The application of diameter group designation $n$ is also illustrated in Figs. 2 and 3.

The grading of axle journals based on their outside diameters and the grading of journal bearings based on the bore diameters of their linings are in accordance with the table shown below in which a 100,000 pound capacity class D axle and journal bearing are graded as typical examples. The same procedure is applicable to and is used to grade the other capacities and classes of axles and bearings.

Table No. 2

| Capacity Class Designation ($m$) | Diameter Size Group ($n$) | Outside Diameter Axle Journal | Journal Bearing Bore Diameter |
|---|---|---|---|
| D | none | 5.5 | 5.5 |
| D | I | 5.4 | 5.4 |
| D | II | 5.3 | 5.3 |
| D | III | 5.2 | 5.2 |
| D | IIII | 5.1 | 5.1 |

In carrying the principal embodied in my invention into practice the journals of new axles should be turned or machined to the new dimension for the capacity of axle involved and the appropriate capacity class designation $m$ placed thereon as shown in Fig. 2 to identify them as such after they are in place on car. This marking will thereafter signify to anyone concerned that when selecting a bearing for application to a journal so marked a bearing of like marking should be chosen and thereby insure a proper fit between them. In accordance with my invention machining of journals to remove imperfections should be performed in such manner that it will produce the next smaller diameter indicated in the above table that can be obtained after all imperfections are removed. To signify such newly established journal diameter the appropriate size group marking $n$ as shown in Table No. 2 should be applied and located as shown in Fig. 2 to govern subsequent selection of bearings for applications thereto. Axles should be remarked in accordance with the foregoing following each such reduction in journal diameter until the axles are ultimately condemned for further service.

This method of fitting the bearings to journals and of marking them may be followed in connection with other capacities and classes of axles and bearings heretofore mentioned differing therefrom only with respect to the capacity class and diameter size groups applicable to them. It may also be followed when journal bearings are applicable to journals not previously graded and marked in accordance with my invention by first determining the actual diameters of such journals and then selecting and applying bearings of proper size to them.

It will be evident from the foregoing that my method of fitting bearings to axle journals, and provision of a group of bearings with preformed bearing surfaces conforming in contour to the bearing surface of a journal at different stages of diameter reduction, solve a long-felt want in reducing and eliminating to a large extent bearing failures causing trouble and expense, and that by the use of my system of marking journals and bearings the work of fitting is simplified so that time and labor will be saved in the fitting operations to maintain a proper bearing area contact between journals and bearings at all stages of wear of the journals between nominal and condemnation diameters.

The method described and the typical sizes and range of sizes used herein to illustrate the application of my invention contemplated that the journals and bearings when properly fitted and mated will conform with each other as to bearing surface curvature. The grading of axles to accomplish such proper fitting and mating, therefore, will create little difficulty or inconvenience when dealing with new axles and with used axles having had their journals machined to establish predetermined sizes. If when carrying my invention into practice it is desired to take advantage of it when fitting bearings to ungraded and unmarked journals of axles in stock or in service notwithstanding that the journal diameters thereof may deviate slightly but never more than 0.05 inch from the nearest or 0.10 inch from the next higher size group described herein, it is embodied in my invention and contemplated therein that in such cases a bearing of the next larger diameter size group should be selected for application thereto. This practice insures the fitting of such ungraded unmarked journals with bearings which will have a minimum of divergence between their contacting bearing surfaces and hence will wear in to a full bearing contact more rapidly and cause less lubrication trouble than if a bearing of new standard size were used as heretofore has been the custom. The designs, practices and methods embodied in my invention for reducing lubrication failures through more properly fitting bearings to axle journals are therefore applicable to all A. A. R. standard classes and sizes of axles from the time new until finally condemned for further service.

It is evident that my method of fitting bearings to axle journals and means of establishing a group of journal bearings with preformed bearing surfaces conforming in contour to the bearing surfaces of a corresponding group of journals having common predetermined diameter at each different stage of diameter reduction, will furnish the long needed relief from the troublesome, expensive and exasperating lubrication failures with which the railroads are confronted and that through the use of my system of marking bearings and journals, the work of inspecting, selecting, supplying and fitting them can be done properly, efficiently and economically and bring about much needed and looked for reduction in maintenance expense, elimination of train delays and improvement in overall railway service.

From the foregoing, the need, purpose, development, mode of applying and using my invention and its advantages will be readily understood by those versed in the art without a further and extended description, and, while I have disclosed certain preferred means for carrying the invention into practice, it is understood that changes in the means of doing so falling within the scope of the appended claims may be made without departing from the spirit or sacrificing any of the advantages of the invention.

I claim:

1. Method of making and repairing railway axle journal and journal bearing assemblies which comprises: forming the axle journals with a given diameter and the bore of journal bearings with the same diameter, forming additional journal bearings in a plurality of sizes decreasing in bore diameter from said given diameter, marking each axle journal and each journal bearing to show its size, applying to said axle journals of said given diameter said journal bearings having the same bore diameter, when any of said axle journals becomes worn or damaged reducing the diameter thereof sufficiently to remove blemishes and to a diameter which is the same as the bore diameter of the next smaller of said journal bearings, marking said axle journal reduced in diameter to show its smaller size, applying said next smaller journal bearing to said axle journal reduced in diameter, and continuing the foregoing steps until a predetermined minimum diameter of said axle journal is reached.

2. The invention as set forth in claim 1 wherein the size marks applied to the reduced diameter axle journal are identical, the size marks applied to the journal bearings are identical and the number of marks increases as the diameter is decreased.

References Cited in the file of this patent

UNITED STATES PATENTS 2,288,635    Lyons ------------------ July 7, 1942